(12) United States Patent
Singh et al.

(10) Patent No.: US 11,657,537 B2
(45) Date of Patent: May 23, 2023

(54) SYSTEM AND METHOD FOR CALIBRATING VEHICULAR VISION SYSTEM

(71) Applicant: Magna Electronics Inc., Auburn Hills, MI (US)

(72) Inventors: Jagmal Singh, Aschaffenburg (DE); Sebastian Pliefke, Sailauf (DE); Holger Hess, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 321 days.

(21) Appl. No.: 17/247,967

(22) Filed: Jan. 4, 2021

(65) Prior Publication Data

US 2021/0125376 A1 Apr. 29, 2021

Related U.S. Application Data

(63) Continuation of application No. 16/658,199, filed on Oct. 21, 2019, now Pat. No. 10,885,669, which is a continuation of application No. 15/467,245, filed on Mar. 23, 2017, now Pat. No. 10,453,217.

(60) Provisional application No. 62/312,796, filed on Mar. 24, 2016.

(51) Int. Cl.
*G06T 7/80* (2017.01)
*H04N 17/00* (2006.01)
*B60R 1/00* (2022.01)

(52) U.S. Cl.
CPC ............ *G06T 7/80* (2017.01); *B60R 1/00* (2013.01); *H04N 17/002* (2013.01); *B60R 2300/402* (2013.01); *G06T 2207/10016* (2013.01); *G06T 2207/30252* (2013.01)

(58) Field of Classification Search
None
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,720,580 B2 | 5/2010 | Higgins-Luthman |

(Continued)

OTHER PUBLICATIONS

Van Hamme et al., "Robust monocular visual odometry for road vehicles using uncertain perspective projection" EURASIP Journal on Image and Video Processing, Dec. 1, 2015.

*Primary Examiner* — Clifford Hilaire
(74) *Attorney, Agent, or Firm* — Honigman LLP

(57) ABSTRACT

A method of calibrating a vehicular vision system includes mounting a camera at a vehicle moving along a vehicle assembly line. Responsive to processing of image data captured by the camera, ground features adjacent to the vehicle are determined and the determined ground features are tracked over two or more frames of captured image data using optical flow. A misalignment of the camera is determined via tracking the determined ground features as the vehicle moves along the straight path portion of the end of line test portion of the vehicle assembly line. Responsive to determination of misalignment of the camera at the vehicle, the vehicular vision system is calibrated using an assumption that the determined ground features lie in a plane parallel to a planar portion of a ground surface adjacent the straight path portion of the end of line test portion of the vehicle assembly line.

29 Claims, 3 Drawing Sheets

(56) References Cited

U.S. PATENT DOCUMENTS

| | | |
|---|---|---|
| 7,855,755 B2 | 12/2010 | Weller et al. |
| 7,914,187 B2 | 3/2011 | Higgins-Luthman et al. |
| 7,949,486 B2 | 5/2011 | Denny et al. |
| 8,421,865 B2 | 4/2013 | Euler et al. |
| 9,150,155 B2 | 10/2015 | Vico et al. |
| 9,205,776 B2 | 12/2015 | Turk |
| 9,357,208 B2 | 5/2016 | Gupta et al. |
| 9,491,450 B2 | 11/2016 | Kussel |
| 9,491,451 B2 | 11/2016 | Pliefke |
| 9,563,951 B2 | 2/2017 | Okouneva |
| 9,688,200 B2 | 6/2017 | Knudsen |
| 9,723,272 B2 | 8/2017 | Lu et al. |
| 9,762,880 B2 | 9/2017 | Pflug |
| 9,834,153 B2 | 12/2017 | Gupta et al. |
| 10,453,217 B2 | 10/2019 | Singh et al. |
| 10,885,669 B2 | 1/2021 | Singh et al. |
| 2001/0006554 A1 | 7/2001 | Kakinami |
| 2014/0169627 A1 | 6/2014 | Gupta |
| 2014/0176605 A1 | 6/2014 | Gibson et al. |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |
| 2015/0002670 A1 | 1/2015 | Bajpai |
| 2015/0049193 A1 | 2/2015 | Gupta et al. |
| 2015/0175072 A1 | 6/2015 | Sabeti |
| 2015/0178576 A1 | 6/2015 | Gupta |
| 2015/0291215 A1 | 10/2015 | Bajpai et al. |
| 2016/0176343 A1 | 6/2016 | Sakano et al. |
| 2016/0180182 A1 | 6/2016 | Gupta et al. |
| 2016/0210750 A1 | 7/2016 | Singh et al. |
| 2016/0335510 A1 | 11/2016 | Gupta et al. |
| 2017/0278270 A1 | 9/2017 | Singh et al. |
| 2018/0053322 A1 | 2/2018 | Singh et al. |
| 2018/0174327 A1 | 6/2018 | Singh |
| 2018/0281698 A1 | 10/2018 | Tang et al. |
| 2018/0299533 A1 | 10/2018 | Pliefke et al. |

SYSTEM AND METHOD FOR CALIBRATING VEHICULAR VISION SYSTEM

CROSS REFERENCE TO RELATED APPLICATIONS

The present application is a continuation of U.S. patent application Ser. No. 16/658,199, filed Oct. 21, 2019, now U.S. Pat. No. 10,885,669, which is a continuation of U.S. patent application Ser. No. 15/467,245, filed Mar. 23, 2017, now U.S. Pat. No. 10,453,217, which claims the filing benefits of U.S. provisional application, Ser. No. 62/312,796, filed Mar. 24, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (such as one or more CMOS cameras) to capture image data representative of images exterior of the vehicle, and provides a calibration system that is operable to determine calibration parameters for the camera or cameras of the vision system without use of fiducial markers or targets in the field of view of the camera or cameras.

According to an aspect of the present invention, the camera calibration system of includes a camera disposed at a vehicle and having a field of view exterior of the vehicle, and an image processor operable to process image data captured by the camera. Responsive to processing of image data captured by the camera, the camera calibration system determines features at the ground near the vehicle and tracks the determined features over two or more frames of captured image data. Responsive to image processing of frames of captured image data during movement of the vehicle along generally straight path on a generally planar surface, the camera calibration system is operable to calibrate said camera. The camera calibration system is operable to calibrate the camera by using an assumption that the determined features lie in a plane and that the vehicle lies in the same plane. Thus, the camera calibration system according the invention is suitable for calibrating all of the cameras as the vehicle is driven along an end-of-line (EOL) test at a vehicle assembly plant without use of fiducial markers or patterns or targets.

The cameras (such as one or more CMOS cameras) capture image data representative of images exterior of the vehicle, and provide the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
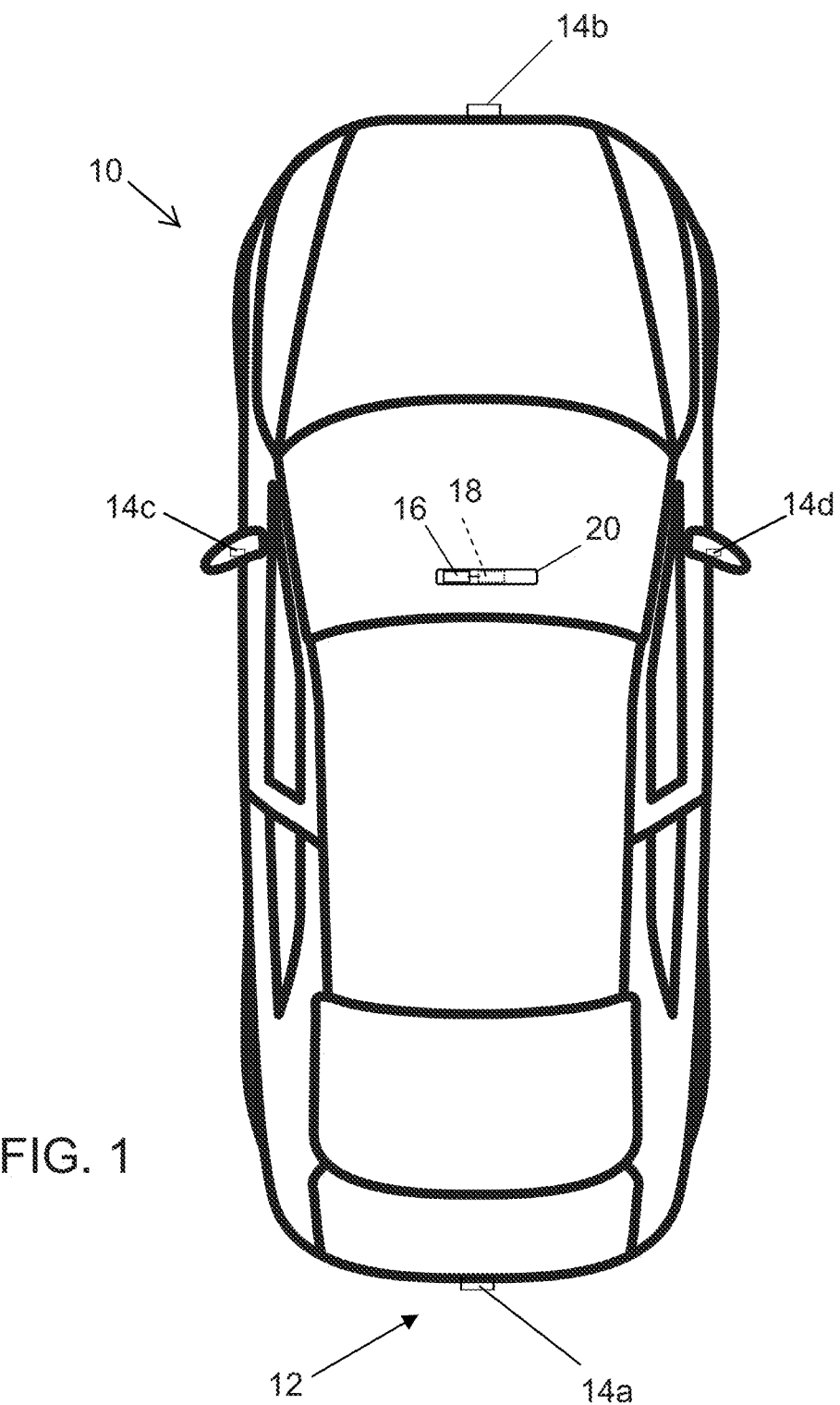
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward viewing imaging sensor or camera 14a (and the system may optionally include multiple exterior facing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The cameras operate to capture frames of image data at a desired or selected frame rate, such as, for example, about 30 frames per second or more or less. The data transfer or signal communication from the camera to the ECU may comprise any suitable data or communication link, such as a vehicle network bus or the like of the equipped vehicle.

The present invention provides a targetless calibration system for calibrating cameras of a vehicle vision system. The system is operable to process image data captured by one or more of the cameras 14a, 14b, 14c or 14d to detect features (see white crosses 22 on the ground 24 near the vehicle as well as the other black crosses 21 at the further 3D space in the upper region 23, such as at the house and trees in the background and not at the ground plane in FIG. 2) on subsequent frames to obtain optical flow of the camera.

Figure 2:
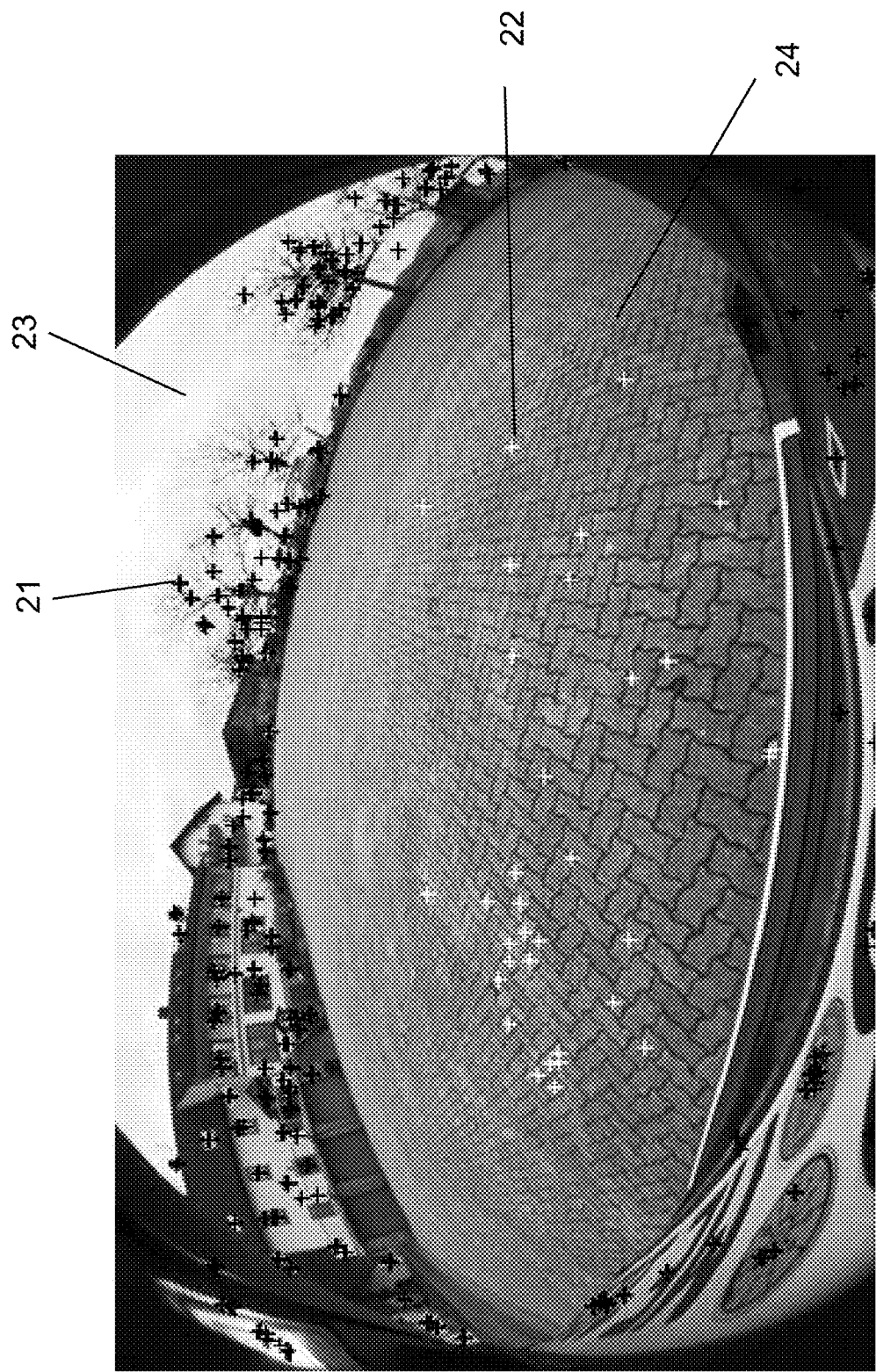
FIG. 2 is an image captured by a camera of the vehicle, showing determined features at the ground near the vehicle that lie in the same plane as the vehicle.

As shown in FIG. 2, several features are extracted in the image data captured by the rear-view camera which will be tracked in the subsequent images for optical flow calculations. Using optical flow, the system can generate structure from motion (SfM). Common camera self-calibration systems typically require at least one straight drive and one maneuver to determine the roll angle of the camera, or to determine on which plane the vehicle is moving. When assuming the vehicle is driving on a straight ground, such as in a vehicle assembly plant, the determination on which plane the vehicle is moving is given and for extrinsic calibration there is no dependency of having another driving maneuver.

When collecting the features on a straight drive, a camera calibration can be achieved, but ambiguity in the vector normal to the vehicle plane is there prior to the present invention. The system of the present invention, when tracking the features, makes it is possible to specifically extract the features (in our case the white crosses at the ground area) which lie on a plane. Mostly these will be the features with lowest height as they are found on the ground plane. Normal to this plane will give a vector normal to the vehicle plane, assuming vehicle is moving on a planar surface. The assumption that the vehicle is moving on a planar surface is easy to meet at end of line calibration situations inside an assembly plant. Thus, the system uses the assumption that the determined features lie in the same or common plane as the vehicle (or a plane parallel to a plane along which the camera is moving), such that processing and tracking of the features over multiple frames of captured image data can determine a misalignment of the camera at the vehicle.

Figure 3:
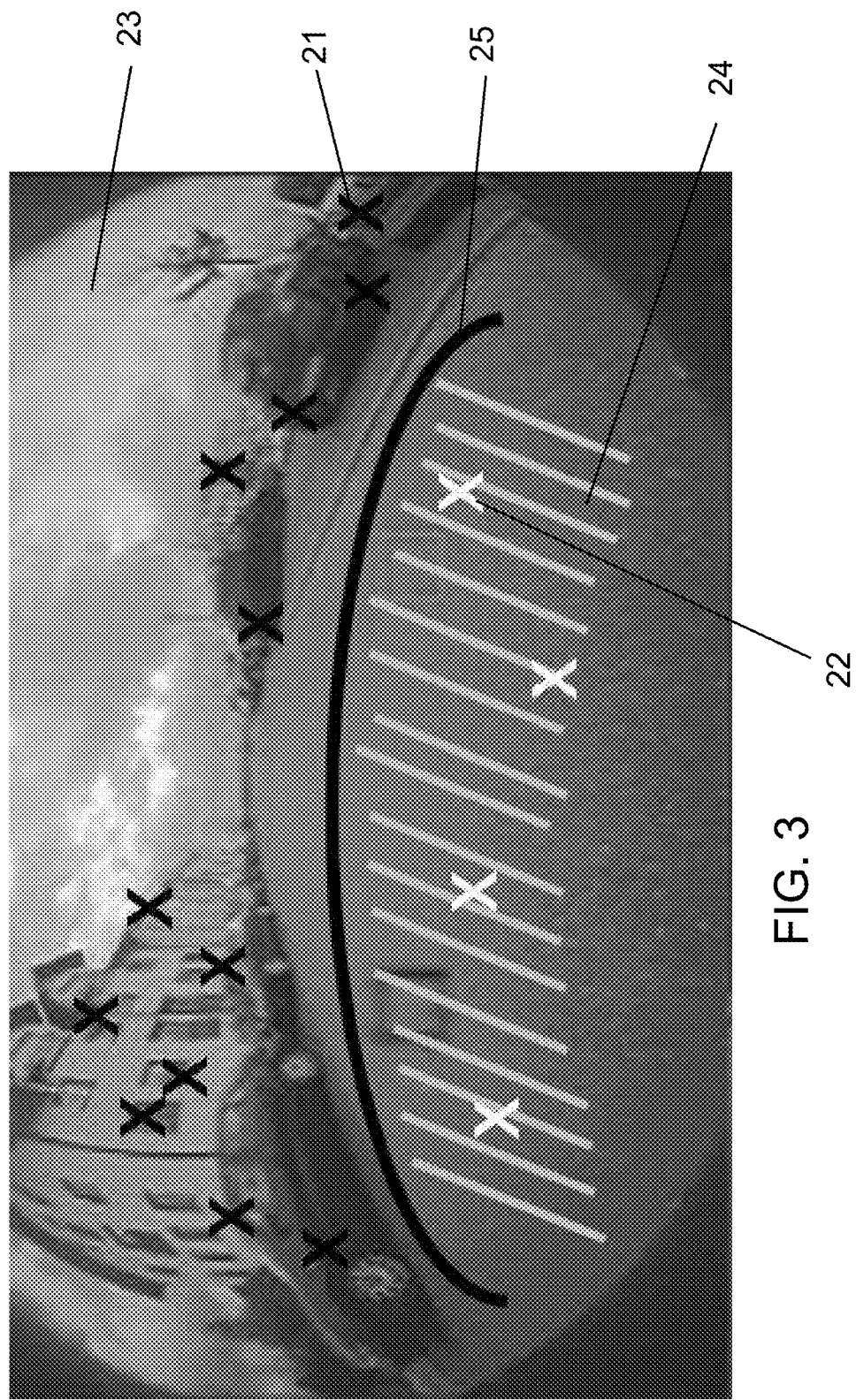
FIG. 3 illustrates the assumption that the feature closer to the camera is on the ground plane (white crosses 22 on the ground region 24), and using structure from motion (SfM) from these features will help to estimate the roll angle of camera, and using SfM from other features (black crosses) 23, including these on the ground, will give pitch and yaw of the vehicle, with the maximal height of the features that are reflected as ground features is represented by the borderline 25.

The features at the ground plane (white crosses on the ground in FIG. 2) will always lie closer to the camera at the lower part of image, while features tracked on objects with height (see, for example, the other crosses in FIG. 2 at the houses and trees in the background) shall be dominated in the remaining portion of image. Following this assumption, it is possible to pick out the features useful for the calibration algorithm and distinguish them from these which should be ignored. Features above a certain height in the camera fish eye view should be ignored. FIG. 3 shows a borderline 25 which divides the features 22 reflected in the calibration algorithm from these which are ignored 21. In contrast to normal camera lens systems, the borderline 25 in a fish eye camera lens system must be substantially curved when following the same height (horizontal). With this assumption, the required performance can also be achieved in order to track these particular picked features.

The system of the present invention thus may provide an algorithm that performs a fast and reliable targetless calibration of one or more cameras installed on a vehicle (in other words, the system estimates camera calibration parameters) in the assembly plant of the OEM. In such automaker assembly plants, the being-built vehicles are conveyed along an assembly line, large portions of which convey the being-built vehicles along a straight path. The system thus eliminates the need for any camera calibration requiring special setup, such as, for example, a vehicle manufacturer or factory end-of-line process or service-station or the like. Optionally, the system may utilize a motion model for the camera calibration, such as a kinematic model of vehicle motion by utilizing aspects of the calibration systems of the types described in U.S. Publication Nos. US-2014-0347486 and/or US-2014-0350834, which are hereby incorporated herein by reference in their entireties. This system can be used for in-field calibration as well.

Various vehicle camera calibration systems have been proposed, such as those described in U.S. Pat. Nos. 8,421, 865; 7,914,187 and/or 7,949,486, and/or U.S. Publication Nos. US-2015-0049193; US-2014-0176605 and/or US-2014-0320658, which are all hereby incorporated herein by reference in their entireties. Such systems typically use and rely on a reference element on the vehicle itself. For outside viewing cameras (such as a side camera disposed at or in an exterior rearview mirror of the vehicle), the vehicle manufacturer may initially calibrate the camera in the vehicle assembly plant, where the system is trained or set to correctly display on the screen what is actually occurring or existing in real life on the ground at or near the vehicle. If nothing changes over time, the system will continue to work properly. But over time, things change (for example, the exterior mirror may be moved in any of six degrees of freedom, such as along the x, y and z directions and/or about three rotational axes), out of which rotational changes have larger effects on top-view or bird's eye view quality, and the camera follows any changes in the mirror so that what is shown on the display screen may no longer be true to the actual outside scene or reality. With multiple cameras, this may become critical if one camera is out of sync with other cameras. While use of a reference point works to calibrate the cameras, the reference point may also be changed on the vehicle.

The system of the present invention calibrates the cameras rotational offsets of the vehicle multi-camera system without use of reference points on the vehicle. The system figures out that a camera is out of calibration and then figures out how to calibrate it, all while the vehicle is being driven by the driver. The system is suitable for use in an end of line testing of the vehicle camera system, where the vehicle is being driven in a generally straight line on a generally planar surface or floor.

The system utilizes multiple cameras at the vehicle. The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for calibrating a vehicular vision system, said method comprising:
mounting a camera at a vehicle moving along a vehicle assembly line, the camera, when mounted at the vehicle moving along the vehicle assembly line, having a field of view exterior of the vehicle, wherein the camera comprises a CMOS imaging array having at least one million photosensor elements arranged in columns and rows;
disposing a control at the vehicle moving along the vehicle assembly line, the control comprising an image processor;
capturing frames of image data via the camera as the vehicle moves along an end of line test portion of the vehicle assembly line;
providing to the control frames of image data captured by the camera as the vehicle moves along the end of line test portion of the vehicle assembly line;
processing via the image processor frames of image data captured by the camera as the vehicle moves along the end of line test portion of the vehicle assembly line;
determining, via processing by the image processor of frames of image data captured by the camera as the vehicle moves along a straight path portion of the end of line test portion of the vehicle assembly line, ground features adjacent to the vehicle assembly line;

as the vehicle moves along the straight path portion of the end of line test portion of the vehicle assembly line, tracking using optical flow the determined ground features over two or more frames of image data captured by the camera;

determining misalignment of the camera at the vehicle via tracking the determined ground features as the vehicle moves along the straight path portion of the end of line test portion of the vehicle assembly line; and responsive to determination of misalignment of the camera at the vehicle, calibrating the vehicular vision system to accommodate the determined misalignment of the camera at the vehicle by using an assumption that the determined ground features lie in a plane parallel to a planar portion of a ground surface adjacent the straight path portion of the end of line test portion of the vehicle assembly line.

2. The method of claim 1, wherein the determined ground features are at the planar portion of the ground surface adjacent the straight path portion of the vehicle assembly line.

3. The method of claim 2, wherein determining misalignment of the camera at the vehicle comprises, via processing by the image processor of frames of image data captured by the camera as the vehicle moves along the straight path portion of the end of line test portion of the vehicle assembly line, extracting ground features that lie on the ground surface.

4. The method of claim 3, wherein determining misalignment of the camera at the vehicle comprises determining vectors normal to the planar portion of the ground surface over two or more frames of image data captured by the camera as the vehicle moves along the end of line test portion of the vehicle assembly line.

5. The method of claim 1, comprising generating structure from motion via tracking using optical flow the determined ground features over two or more frames of image data captured by the camera.

6. The method of claim 1, wherein determining misalignment of the camera at the vehicle comprises determining rotational offset of the camera relative to the vehicle.

7. The method of claim 1, wherein determining misalignment of the camera at the vehicle is done without use of reference points on the vehicle.

8. The method of claim 1, wherein the camera comprises a rearward viewing camera mounted at a rear portion of the vehicle.

9. The method of claim 1, wherein mounting the camera at the vehicle comprises mounting a plurality of cameras at the vehicle, and wherein each camera of the plurality of cameras, when mounted at the vehicle moving along the vehicle assembly line, has a respective field of view exterior of the vehicle, and wherein the image processor processes image data captured by the plurality of cameras as the vehicle moves along the end of line test portion of the vehicle assembly line to determine misalignment of any one or more of the cameras of the plurality of cameras at the vehicle, and wherein, responsive to determination of misalignment of one or more of the cameras at the vehicle, the vehicular vision system is calibrated to accommodate the determined misalignment.

10. The method of claim 9, wherein the vehicular vision system is calibrated without use of target patterns at the end of line test portion of the vehicle assembly line in the fields of view of the plurality of cameras.

11. The method of claim 9, wherein image data captured by at least some of the plurality of cameras is used for a surround view system of the vehicle.

12. The method of claim 9, wherein one camera of the plurality of cameras comprises a rear camera mounted at a rear portion of the vehicle, and another camera of the plurality of cameras comprises a side camera mounted at a driver-side exterior rearview mirror assembly of the vehicle and another camera of the plurality of cameras comprises a passenger side camera mounted at a passenger-side exterior rearview mirror assembly of the vehicle.

13. The method of claim 1, wherein determining ground features comprises determining features in the field of view of the camera having height at or below a threshold level and ignoring features in the field of view of the camera having height above the threshold level.

14. The method of claim 1, wherein the steps of determining misalignment of the camera and calibrating the vehicular vision system are performed without use of a target pattern at the end of line test portion of the vehicle assembly line.

15. A method for calibrating a vehicular vision system, said method comprising:

mounting a camera at a rear portion of a vehicle moving along a vehicle assembly line, the camera, when mounted at the rear portion of the vehicle moving along the vehicle assembly line, having a field of view exterior and at least rearward of the vehicle, wherein the camera comprises a CMOS imaging array having at least one million photosensor elements arranged in columns and rows;

disposing a control at the vehicle moving along the vehicle assembly line, the control comprising an image processor;

capturing frames of image data via the camera as the vehicle moves along an end of line test portion of the vehicle assembly line;

providing to the control frames of image data captured by the camera as the vehicle moves along the end of line test portion of the vehicle assembly line;

processing via the image processor frames of image data captured by the camera as the vehicle moves along the end of line test portion of the vehicle assembly line;

determining, via processing by the image processor of frames of image data captured by the camera as the vehicle moves along a straight path portion of the end of line test portion of the vehicle assembly line, ground features adjacent to the vehicle assembly line;

as the vehicle moves along the straight path portion of the end of line test portion of the vehicle assembly line, tracking using optical flow the determined ground features over two or more frames of image data captured by the camera;

determining rotational offset of the camera at the vehicle via tracking the determined ground features as the vehicle moves along the straight path portion of the end of line test portion of the vehicle assembly line;

wherein determining rotational offset of the camera at the vehicle is done without use of reference points on the vehicle; and responsive to determination of rotational offset of the camera at the vehicle, calibrating the vehicular vision system to accommodate the determined rotational offset of the camera at the vehicle by using an assumption that the determined ground features lie in a plane parallel to a planar portion of a ground surface adjacent the straight path portion of the end of line test portion of the vehicle assembly line.

16. The method of claim 15, wherein the determined ground features are at the planar portion of the ground surface adjacent the straight path portion of the vehicle assembly line.

17. The method of claim 16, wherein determining rotational offset of the camera at the vehicle comprises, via processing by the image processor of frames of image data captured by the camera as the vehicle moves along the straight path portion of the end of line test portion of the vehicle assembly line, extracting ground features that lie on the ground surface.

18. The method of claim 15, comprising generating structure from motion via tracking using optical flow the determined ground features over two or more frames of image data captured by the camera.

19. The method of claim 15, wherein determining ground features comprises determining features in the field of view of the camera having height at or below a threshold level and ignoring features in the field of view of the camera having height above the threshold level.

20. The method of claim 15, wherein the steps of determining rotational offset of the camera and calibrating the vehicular vision system are performed without use of a target pattern at the end of line test portion of the vehicle assembly line.

21. A method for calibrating a vehicular vision system, said method comprising:

mounting a plurality of cameras at a vehicle moving along a vehicle assembly line, the plurality of cameras, when mounted at the vehicle moving along the vehicle assembly line, having respective fields of view exterior of the vehicle, wherein each camera of the plurality of cameras comprises a CMOS imaging array having at least one million photosensor elements arranged in columns and rows;

disposing a control at the vehicle moving along the vehicle assembly line, the control comprising an image processor;

capturing frames of image data via the plurality of cameras as the vehicle moves along an end of line test portion of the vehicle assembly line;

providing to the control frames of image data captured by the plurality of cameras as the vehicle moves along the end of line test portion of the vehicle assembly line;

processing via the image processor frames of image data captured by the plurality of cameras as the vehicle moves along the end of line test portion of the vehicle assembly line;

determining, via processing by the image processor of frames of image data captured by the plurality of cameras as the vehicle moves along a straight path portion of the end of line test portion of the vehicle assembly line, ground features adjacent to the vehicle assembly line;

as the vehicle moves along the straight path portion of the end of line test portion of the vehicle assembly line, tracking using optical flow the determined ground features over two or more frames of image data captured by each camera of the plurality of cameras;

determining rotational offset of at least one camera of the plurality of cameras at the vehicle via tracking the determined ground features as the vehicle moves along the straight path portion of the end of line test portion of the vehicle assembly line; and responsive to determination of rotational offset of at least one camera of the cameras at the vehicle, calibrating the vehicular vision system to accommodate the determined rotational offset by using an assumption that the determined ground features lie in a plane parallel to a planar portion of a ground surface adjacent the straight path portion of the end of line test portion of the vehicle assembly line.

22. The method of claim 21, wherein the determined ground features are at the planar portion of the ground surface adjacent the straight path portion of the vehicle assembly line.

23. The method of claim 21, comprising generating structure from motion via tracking using optical flow the determined ground features over two or more frames of image data captured by the plurality of cameras.

24. The method of claim 21, wherein determining rotational offset of at least one camera of the plurality of cameras at the vehicle is done without use of reference points on the vehicle.

25. The method of claim 21, wherein the vehicular vision system is calibrated without use of target patterns at the end of line test portion of the vehicle assembly line in the fields of view of the plurality of cameras.

26. The method of claim 21, wherein image data captured by at least some cameras of the plurality of cameras is used for a surround view system of the vehicle.

27. The method of claim 21, wherein one camera of the plurality of cameras comprises a rear camera mounted at a rear portion of the vehicle, and another camera of the plurality of cameras comprises a side camera mounted at a driver-side exterior rearview mirror assembly of the vehicle and another camera of the plurality of cameras comprises a passenger side camera mounted at a passenger-side exterior rearview mirror assembly of the vehicle.

28. The method of claim 21, wherein determining ground features comprises determining features in the fields of view of the plurality of cameras having height at or below a threshold level and ignoring features in the fields of view of the plurality of cameras having height above the threshold level.

29. The method of claim 21, wherein the steps of determining rotational offset and calibrating the vehicular vision system are performed without use of a target pattern at the end of line test portion of the vehicle assembly line.

* * * * *